April 9, 1968 — E. F. SUBOCZ — 3,377,348
WELDING OF PLASTIC PANELS
Filed Aug. 23, 1965 — 2 Sheets-Sheet 1
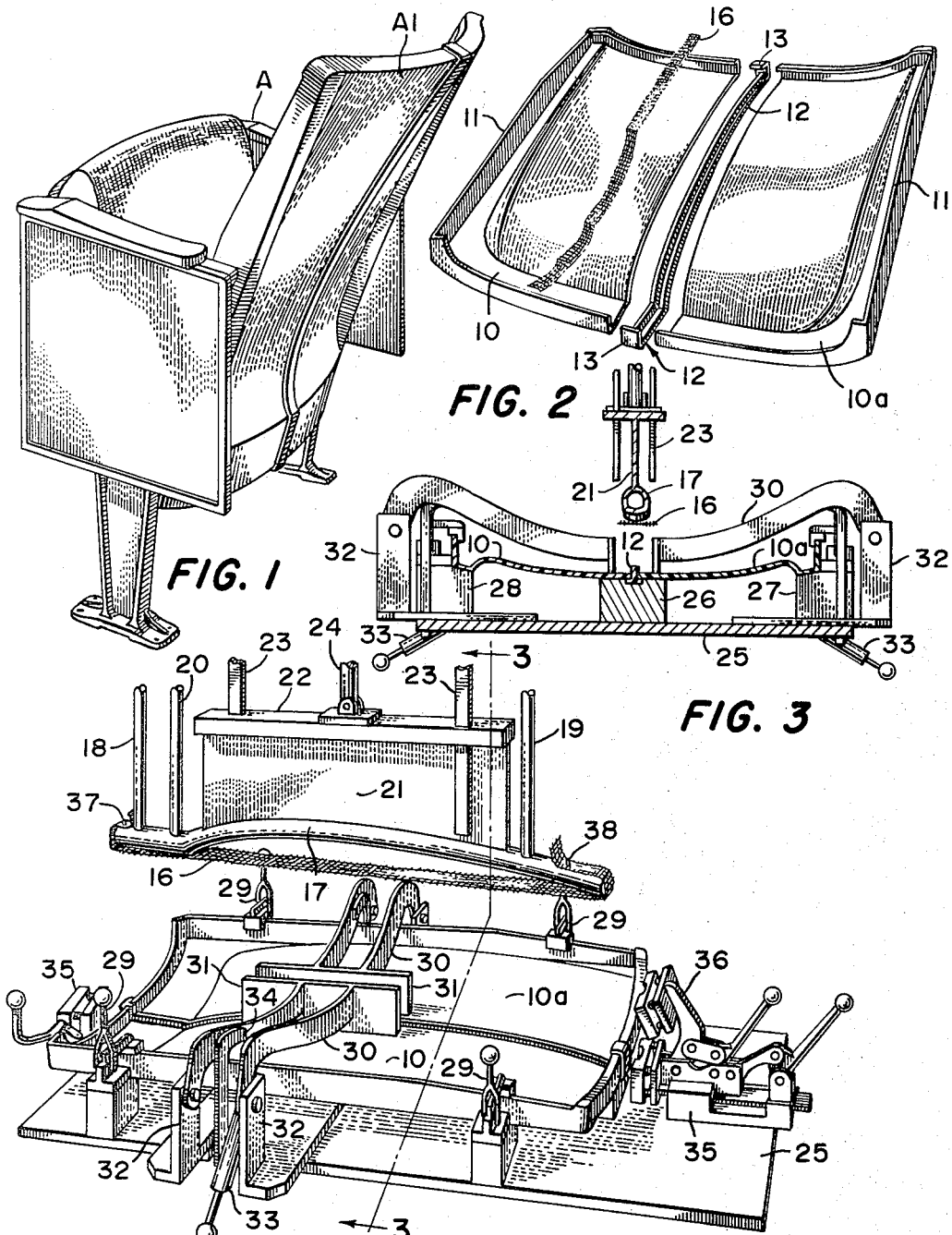
INVENTOR
Edward F. Subocz
BY Dawson, Tilton, Fallon, Lungmus, and Alexander
ATTORNEY
WITNESS
Harry S. Brown Jr.

April 9, 1968  E. F. SUBOCZ  3,377,348
WELDING OF PLASTIC PANELS
Filed Aug. 23, 1965  2 Sheets-Sheet 2

INVENTOR
Edward F. Subocz
BY Dawson, Tilton, Fallon,
Lungmus, and Alexander
ATTORNEY WITNESS
Harry S. Brown Jr.

United States Patent Office 3,377,348
Patented Apr. 9, 1968

3,377,348
WELDING OF PLASTIC PANELS
Edward F. Subocz, Grand Rapids, Mich., assignor to American Seating Company, Grand Rapids, Mich., a corporation of New Jersey
Filed Aug. 23, 1965, Ser. No. 481,840
2 Claims. (Cl. 264—248)

ABSTRACT OF THE DISCLOSURE

A process for uniting plastic panels into an integrated panel structure in which wire mesh is embedded in the plastic bond uniting the parts which includes providing two thermoplastic panels and a thermoplastic rib positioned therebetween and extending thereabove, applying a strip of metal screen over said upstanding rib and overlapping the panel edges, and applying heat to said rib to cause the same to melt and flow through holes in the screen and into contact with the panel edges to form a single fused panel incorporating an embedded screen reinforcement.

---

This invention relates to the welding of plastic panels, and is particularly useful in the welding of three-piece plastic panels into a single strong panel.

In present-day practice considerable savings are realized in the fabricating of theater chairs, and the like, where the chairs are of varying widths, by first fabricating the theater seat back of plastic material in the widest desired dimension and thereafter severing the back and after removing a segment along the back, welding the parts together to form a narrow seat back panel. There are various other needs for the uniting of plastic panels, but in all of these a problem exists in providing a weld of sufficient strength. The problem is intensified where the panels to be united are thin and relatively wide and where, as in the case of seat backs, they are required to take relatively heavy stresses.

I have discovered that by bringing the thin panel portions together in overlapping relation with a substantially T-shaped back rib and overlaying the back rib with steel mesh, an effective bonding of the parts is brought about with the wire mesh embedded in the plastic and anchoring all the parts together in a single strong panel.

A primary object, therefore, is to provide a process for uniting plastic panels with reinforcing wire mesh embedded in the panels. A further object is to provide a method of making an integrated panel structure in which wire mesh is embedded in the plastic bond uniting the parts. A still further object is to provide a process by which plastic panels can be rapidly and effectively united in a reinforced strong panel. Other specific objects and advantages will appear as the specification proceeds.

The invention is shown, in an illustrative embodiment, by the accompanying drawings, in which—

Figure 5:
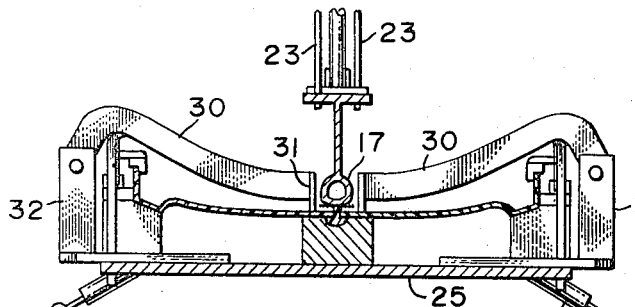
Figure 6:
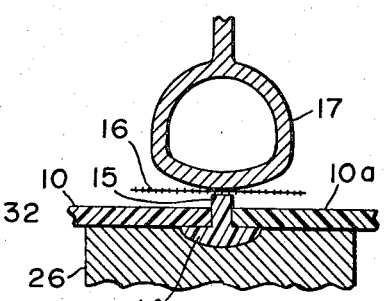
Figures 7, 8:
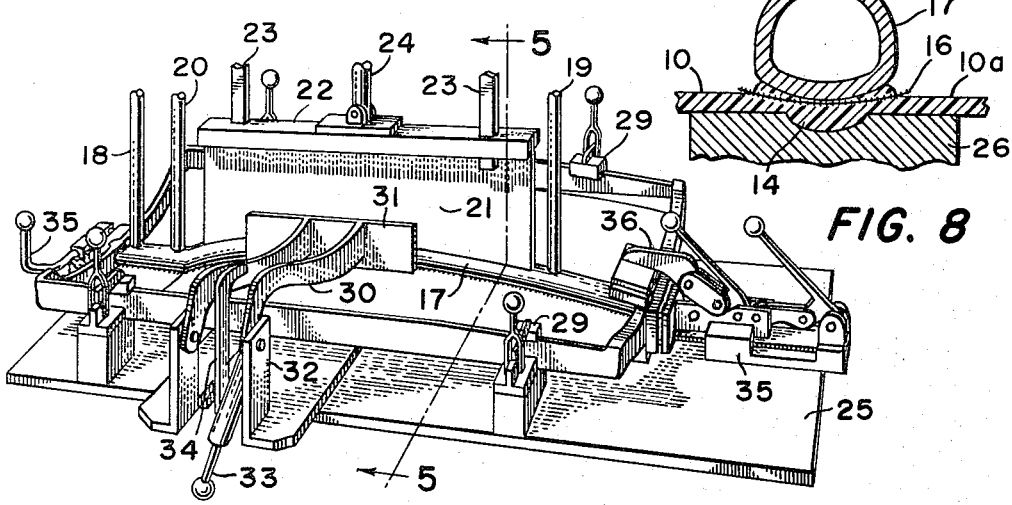
Figures 9, 10:
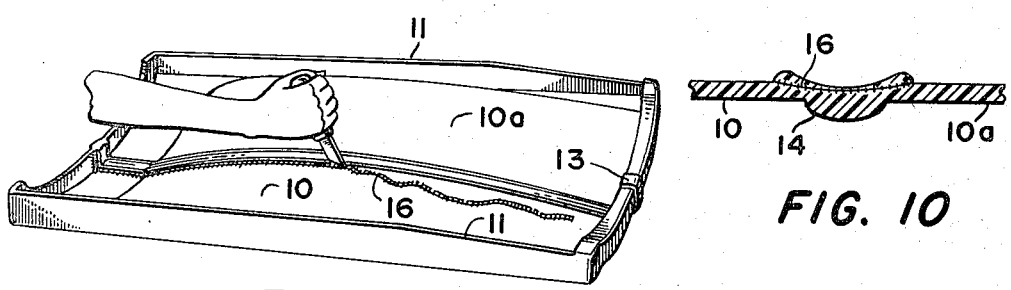

FIGURE 1 is a rear perspective view of a theater chair showing the back of the chair reinforced with a back or center rib; FIG. 2, a perspective view of the plastic parts of the chair back which are to be united and showing also a wire mesh strip; FIG. 3, a vertical sectional view of clamping apparatus and welding apparatus which may be employed in the welding operation, the section being taken as indicated at line 3—3 of FIG. 4; FIG. 4, a perspective view of the clamping and support means and the welding apparatus; FIG. 5, a view similar to FIG. 3 but showing the welding tube and wire screen in position for the welding operation, a section being taken as indicated at line 5—5 of FIG. 7; FIG. 6, a broken and greatly enlarged view of the welding apparatus in the position shown in FIG. 5; FIG. 7, a perspective view of the apparatus shown in the position illustrated in FIG. 5; FIG. 8, a view similar to FIG. 6 but showing the plastic back rib being melted and passing through the wire mesh; FIG. 9, a perspective view showing a method for removal of the excess wire mesh protruding beyond the plastic bond; and FIG. 10, an enlarged detail view showing the completed bond.

In the illustration given in FIG. 1, A designates a theater chair provided with a plastic back A'. While the present invention is applicable to plastic chairs of various types and shapes and to plastic panels for different uses, the invention will be described herein in connection with a theater chair and the plastic back panel of the theater chair.

As illustrated in FIG. 2, the theater chair back has been severed to provide two panels 10 and 10a. The panels are preferably provided with side walls 11 for receiving cushions or upholstery, etc. To unite the panels 10 and 10a, I provide a plastic back rib 12 which may be provided at its ends with vertical portions 13. The back rib 12 may be of any suitable shape. I prefer to employ a back rib which is T-shaped in cross section, as illustrated best in FIG. 6, the rib having a large head portion 14 and an upstanding stem portion 15 which extends between and about the panel parts 10 and 10a.

Above the stem 15 of the back rib is placed a metal wire mesh 16. To the mesh 16 and stem 15 is applied heat by any suitable means to bring about the melting of the plastic and a flow thereof through the mesh to form the bond illustrated best in FIG. 8.

Any suitable means may be provided for applying heat to the stem 15 of the back rib 12. In the illustration given, I provide a steam pipe 17 contoured to the shape of the seat panels 10 and 10a and as illustrated best in FIG. 4. Steam is applied to the pipe 17 through pipe 18 and leaves the pipe through exit tube 19. For cooling the tube 17, a cold water inlet 20 is provided, the cooling water then leaving through pipe 19. It will be understood that flexible hose connections are made with the pipes 18, 19 and 20 for supplying the fluid during the movement of the welding parts.

Any means for supporting the pipe 17 may be employed. In the specific illustration given, a plate 21 is secured to the top portion of pipe 17 and is suspended from a beam 22 slotted to receive fixed guides 23. The beam is supported by a strap 24 pivotally mounted to its lower end upon the beam 22 and carried at its upper end by a support (not shown).

Any means for supporting and clamping the plastic panels 10, 10a and the back rib 12 may be employed. In the illustration given, I provide a platform 25 supporting at its center a base block 26 which is recessed at its top to receive the back rib 14. Similar support blocks 27 and 28 are provided for supporting the side edge portions of the panels 10 and 10a.

Any suitable clamping means may be employed for holding the panels 10 and 10a into snug relation with the T-shaped back rib 12. In the illustration given, four side clamps 29 of well known construction are provided for engaging the sides of the pieces 10 and 10a. Transverse clamps 30 having heavy clamping shoes 31 resting on the inner edges of the panels 10 and 10a anchor the panels firmly in position. The clamp members 30 are pivotally mounted on standards 32 and may be actuated by levers 33 connected to the clamp arms by the vertical members 34.

I also prefer to employ end clamps which are brought into action after the welding apparatus has been moved to the engaging position shown in FIG. 5. The end clamp 35 moves horizontally forward to engage the end portion 13 of the back rib to hold it firmly in position while the vertically movable clamp 36 is brought down on the top of the member 13 at each end of the base 25 to hold this portion of the back rib firmly in engagement with the panels 10 and 10a.

In order to hold the wire mesh 16 in position on the steam tube 17, I provide at one end thereof a hook 37 and, if desired, at the other end of the tube may be provided a similar hook 38. In actual practice, I prefer to omit the hook 38 because the operator can conveniently hold the end of the strip with his hand as the steam pipe 17 is moved downwardly and can allow the wire mesh to slide in an endwise direction as the wire mesh meets the curved portion of the panels 10 and 10a, thus holding the wire mesh tautly against the stem 15 of the back rib 12, as illustrated best in FIGS. 5 and 6.

OPERATION

In the operation of the apparatus, the panel parts 10 and 10a are placed upon the support 25 as illustrated in FIGS. 3 and 4, with the back rib 12 held snugly between them and in overlapping relation and with the stem 15 extending upwardly above the panels. The side clamps 29 are then moved into position to grip the panels and hold them in the set position. Similarly, the heavy clamps 30 are swung into the position shown in FIGS. 3 and 5 with the shoes 31 resting on either side of the panel segments engaging the back rib 12.

The heating tube 17 which is supplied with steam is then moved downwardly, with the mesh 16 held thereon as shown in FIG. 4, and steam is passed through the pipe 18 to heat the tube. The thermoplastic back rib 12 and the panels 10 and 10a flow under the heat applied, with the plastic passing through the wire mesh in the manner illustrated best in FIG. 8. Cooling water is then passed into pipe 17 through pipe 20 to cool the molten material and set the plastic in the bonded position shown in FIG. 8. Excess part of the wire mesh 16 may then be cut away, as illustrated in FIG. 9. The finished bond shown in FIG. 10 has the wire mesh 16 extending not only through the back rib portion, but also through the adjacent portions of panels 10 and 10a so that all of these parts are integrated or reinforced by the wire mesh.

Any suitable metal mesh of steel or other strong wire may be employed. The plastic panels and back rib may be formed of any thermoplastic material such as polyethylene, propropylene, etc.

While in the foregoing specification I have set forth specific structure and process steps in considerable detail for the purpose of illustrating an embodiment of the invention, it will be understood that such details may be varied widely by those skilled in the art without departing from the spirit of my invention.

I claim:

1. In a process for welding two thermoplastic panels having their edges to be joined and lying in adjacent relation, the steps of providing an upstanding thermoplastic rib at said panel edges and extending thereabove, applying a strip of metal screen over said upstanding rib and overlapping said panel edges, and applying heat to said rib to cause the same to melt and flow through holes in the screen and into contact with the panel edges to form a single fused panel incorporating an embedded screen reinforcement.

2. The process of claim 1 in which said rib has a head portion which is pressed against one side of the panel edges and an integral portion extending between said edges and providing an upstanding rib portion on the other side of said edges and extending above said edges.

References Cited

UNITED STATES PATENTS

| 2,974,566 | 3/1961 | Hurley | 264—274 X |
| 3,206,899 | 9/1965 | Wright | 264—248 X |

FOREIGN PATENTS

| 1,162,848 | 9/1958 | France. |
| 691,404 | 7/1964 | Canada. |

ROBERT F. WHITE, *Primary Examiner.*

T. J. CARVIS, *Assistant Examiner.*